Feb. 25, 1964
M. W. OLSON ETAL
3,121,914
MIXER-EXTRUDER METHOD AND APPARATUS
Filed April 10, 1961
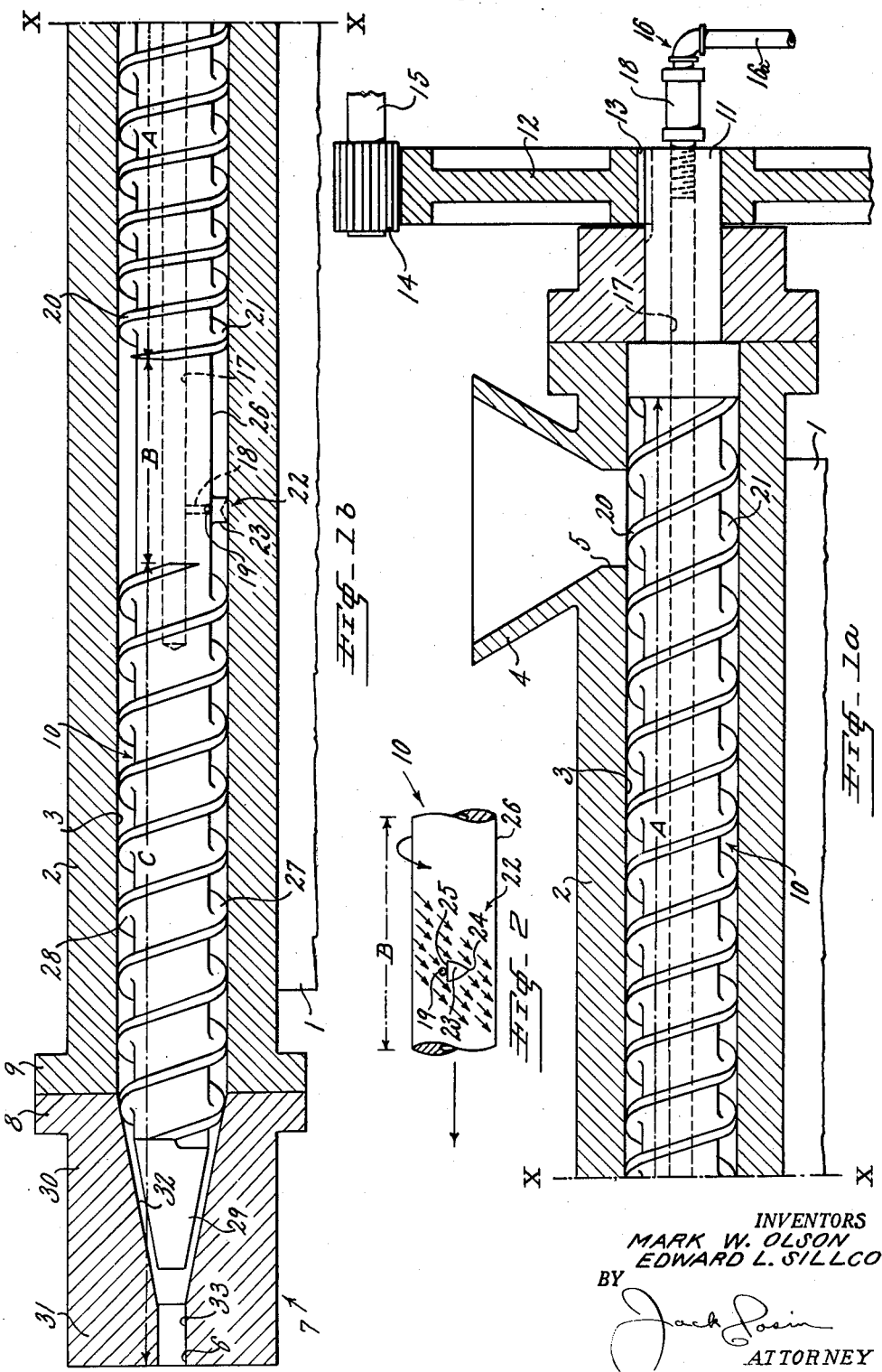
INVENTORS
MARK W. OLSON
EDWARD L. SILLCOX
BY
Jack Posin
ATTORNEY

United States Patent Office 3,121,914
Patented Feb. 25, 1964

3,121,914
MIXER-EXTRUDER METHOD AND APPARATUS
Mark W. Olson, Allendale, and Edward L. Sillcox, Cedar Grove, N.J., assignors to United States Rubber Company, New York, N.Y., a corporation of New Jersey
Filed Apr. 10, 1961, Ser. No. 101,702
10 Claims. (Cl. 18—12)

This invention relates to a method of and apparatus for compounding and mixing plastic materials, and more particularly, to a method of and apparatus for continuously adding a fluid to an advancing stream of plastic material, thoroughly blending or reacting these components into an end product, and extruding the end product into a desired shape.

The term "plastic material" as used in this application is intended to refer to highly viscous substances such as, for example, heated thermoplastics, unset thermosetting materials, uncured rubber and/or rubber-like materials, tars, gums, etc., while the term "fluid" relates to liquids and/or gases that flow easily and which are desired to be mixed or chemically reacted with the plastic material.

In the processing of plastic materials it is often desirable to add fluids (such as, for example, a liquid solution containing an additive) to the plastic materials in order to achieve an improved end product. Such addition was at one time primarily accomplished in "batch operations" in which predetermined amounts of the plastic material and the fluid were both added to a receptacle, and thereafter the entire batch was kneaded to facilitate uniformity of the mass or chemical reaction between the constituent parts. More recently, the trend has been to shift from batch processing to "enclosed continuous processing" in order to take advantage of such favorable features available in this type of operation as improved production efficiency, better process control, less evaporation and heat-flash loss, and protection from the detrimental effects of exposure to atmosphere.

In the continuous processing operation, plastic material is continuously introduced into a conduit having helical extruder screw means rotatably mounted therein for moving the stock therethrough, fluid is added to the plastic material at a point between the inlet and outlet of the conduit, and mixing of these components thereafter occurs. A number of continuous processing arrangements have been proposed for facilitating the entry and mixing of the fluid with the plastic material; however, various disadvantages have been attendant with many of the proposals. In some cases the mixing or kneading of the mixture has not been thorough enough to intimately disperse the fluid in the plastic material. In other cases the arrangements employed require extensive modifications to pre-existing equipment and/or complex and expensive new apparatus. In still other arrangements extremely high pressures are employed resulting in attendant high power requirements, low efficiency and uneconomical operation.

Accordingly, it is one object of this invention to provide a new and improved method of and apparatus for continuously adding a fluid to a plastic material and intimately dispersing the fluid therein.

It is another object of this invention to provide a new and improved mixer-extruder apparatus that can be readily and inexpensively fashioned by modifying previously existing conventional extruders.

A further object of this invention is to provide a new and improved mixer-extruder apparatus that is economical in operation.

Further objects and advantages of this invention will become apparent as the following description proceeds.

Briefly stated, in accordance with one embodiment of this invention, the method for continuously adding a fluid to a plastic material and intimately mixing these components may include the steps of adding plastic material to a conduit, compacting the plastic material into an advancing plug, helically shearing the advancing plug to create a low pressure area therein, adding a fluid to the low pressure area created by the shearing operation, and thereafter kneading the resultant mixture.

One form of apparatus that may be used in continuously adding a fluid to and mixing it with a plastic material, in accordance with this invention, comprises a conduit having inlet and outlet openings, and a multizone screw means rotatably mounted in the conduit for forcing a plastic material therethrough. Means are provided for forming an advancing plug within the conduit, for shearing the material of the plug to create a low pressure area therein, and for adding fluid to the plug at the point where it has just undergone shear. Means are also provided for kneading the resultant mixture into an intimately mixed or thoroughly reacted end product and extruding the end product from the outlet of the conduit.

While this specification concludes with claims particularly pointing out and distinctly claiming the subject matter regarded as this invention, it is believed that the invention will be better understood from the following description taken in connection with the accompanying drawings in which:

FIGS. 1a and 1b, together, represent a cross-sectional view of one form of mixer-extruder apparatus incorporating this invention, the apparatus being broken along the line X—X for convenience of illustration; and FIG. 2 is a plan view of a portion of the screw used in the apparatus of FIGS. 1a and 1b, showing details of a means used to create a low pressure area or zone within the plug and add fluid to the plug at the zone of low pressure.

Referring to FIGS. 1a and 1b, the mixer-extruder apparatus includes a foundation 1, upon which is supported a generally cylindrical casing 2. The casing 2 is provided with a generally cylindrical inner bore or conduit 3 which is in communication with a feed hopper 4 by means of an inlet opening 5. The inner bore 3 is also in communication with an outlet opening 6 in an extruder die, shown generally at 7, which may be suitably bolted or clamped at flange 8 to a flange 9 located at one end of the casing 2.

A multi-zone helical screw means, shown generally at 10, is rotatably mounted within the inner bore 3. Rotation is imparted to the screw means 10 at one end 11 thereof by means of a gear 12 which is keyed to the end 11 by a key 13. A pinion gear 14, mounted on a shaft 15 that may be driven by a motor (not shown), drivingly engages the gear 12 to turn the screw means 10.

Conduit means, shown generally at 16 is provided to introduce the fluid to the interior of the mixer-extruder apparatus. Conduit means 16 includes a pipe 16a that is adapted to be connected to a source of fluid under pressure (not shown), such as, for example, a reciprocating pump, gear pump or other type of positive displacement pump. The screw 10 is provided with an axial internal passageway 17 having one end that communicates with the pipe 16a through a rotary type seal 18 which compensates for the relative rotation between the screw 10 and the pipe 16a. The other end of the axial passageway 17 communicates with a radial passageway 18 having a feed opening or end 19 terminating at the surface of the screw 10 for introducing the fluid into the interior of the casing 2.

The screw 10 is provided with three main zones or sections, denoted A, B and C. Zone A of the screw 10 represents the feeding and compacting section of the screw. It may be provided with a pair of helical threads 20 and 21 which progress, simultaneously, from the feed hopper opening 5 area of the screw through zone A with a constantly decreasing pitch. The threads 20 and 21 terminate at the end of zone A of the screw 10 at which point the screw 10 is thereafter provided with a no-flight or threadless section, denoted zone B.

In operation, plastic material in granular, pelletized, or small slab form is introduced into the bore 3 through the feed hopper 4 in a conventional manner. It progresses along the decreasing pitched double-lead portion of the screw (zone A) until it is compacted and metered into the no-flight section of the screw (zone B) where it forms a plug that is driven ahead by the force of the plastic material still in the first section (zone A).

Cutting means, shown generally at 22 serve to helically shear the advancing plug. The portion of the plastic material in the plug that has undergone shearing by the cutting means 22 will be under a somewhat lower pressure than the surrounding plastic material of the plug due to a cavitation effect which is similar to that which occurs adjacent a propeller turning in a fluid. This reduction in pressure permits the fluid emanating from the feed opening 19 to flow into the plug of plastic material in the zone of low pressure or low pressure area. Cutting means 22 may comprise a wedge-shaped boss 23 carried by the screw 10 and projecting radially therefrom into close proximity with the inner periphery of the bore 3.

Referring now to FIG. 2, wherein the cutting means 22 has been illustrated in greater detail, it may be seen that the apex 24 of the wedge-shaped boss 23 is pointed generally in the direction of rotation of the screw 10, while the base 25 of the wedge-shaped boss 23 is generally normal to the direction of rotation of the screw 10. The plastic material in contact with the root portion or surface 26 of the screw 10 will tend to rotate with the screw, whereas the plastic material in contact with the inner periphery of the bore 3 (FIG. 1b) will tend to resist rotation and move forward along the axis of the screw 10 under the urging of the feed and compacting portion (zone A) of the screw. The resultant direction of travel of the plastic material in zone B will take a helical path as indicated by the small arrows of FIG. 2. However, the rotational speed of the boss 23 exceeds the speed of movement of the plastic material in a circumferential direction thereby helically shearing the advancing plug. The shearing action of the boss 23 causes cavitation, or a low pressure zone or area, to occur at the trailing edge or base 25 of the boss 23. Since the fluid is injected at this point (via the feed opening 19), it finds its way into the planes of shear in the plastic material without the danger of high local pressure in the plastic material clogging the feed opening 19. Thus, by positioning the fluid feed opening 19 closely adjacent to the base 25 of the wedge-shaped boss 23, the addition of fluid to the plastic material is greatly facilitated.

After introducing the fluid into the plastic material the mixture advances to the end of zone B and is then picked up by the delivery section of the screw 10, denoted generally as zone C.

The delivery section (zone C) of the screw 10, serves to knead the mixture of fluid and plastic material to intimately disperse the fluid in the plastic material and extrude the resultant end product from the apparatus. Zone C, in the preferred embodiment of this invention, includes a double-lead threaded portion having two threads 27 and 28 of constant pitch which pick up the fluid-plastic material mixture and deliver it to a conical no-flight portion 29 formed at the end of screw 10.

The extruder die 7 is divided into two portions, namely, a transition portion 30 and a land portion 31. The transition portion 30 is provided with an interior wall 32 of such a shape that it has a conical projection on a plane parallel to the axis of the inner bore 3, while the land portion 31 includes an interior wall 33 whose cross section is dictated by the shape desired of the extruded article, the latter being in accordance with principles well known in the extruder art.

In order that a kneading action may be given to the material in the delivery section (zone C) of the screw 10, a flow restriction or area of minimum cross section is provided in the transition portion 30 of the die 7. This is achieved by virtue of the protrusion of the conical no-flight portion 29 of the screw 10 into the transition portion 30 of the die 7, the wall of the conical no-flight portion 29 being parallel to and closely spaced from the wall 32 of the die 7 to form the restriction to flow. While it is preferable for the flow restriction, i.e. the minimum cross-sectional area, to occur in the transition portion 30 of the die 7, it may, by suitable modification, be found in the land portion 31 of the die. The flow restriction retards the delivery of material from the threaded portion of zone C, maintaining pressure on zones B and C, and causes a kneading action to occur substantially throughout the entire delivery section (zone C) of the screw 10. The kneading action, in turn, results in the intimate dispersing of the fluid in the plastic material.

The resultant end product is finally extruded from the die 7 at the outlet opening 6 in any desired shape as dictated by the design of the die orifice 6.

The mixer-extruder may be heated or cooled depending upon the nature of the materials being handled. Since relatively high pressures are normally developed within an extruder, the fluid that is introduced must be pumped at pressures just in excess of the pressure at the feed opening 19 within the aparatus. Whether or not the blended materials form an intimate physical mixture or a chemical product depends upon the chemical properties of the materials under the conditions of temperature and pressure employed in the process.

It will be apparent that many variations of the preferred embodiment may be devised by those skilled in the art without departing from the broader aspects of this invention. For example, the feeding and compacting section (zone A) of the screw 10 might be replaced by a feeding and compacting zone in which the root diameter of the screw progressively increases, rather than employing a screw having a decreasing double-lead pitch in this portion. Similarly, numerous alternative arrangements may be given to the cutting means 22 to achieve the results of this invention. For example, the boss 23 might be circular or rectangular in shape rather than wedge-shaped. It might even be planar or wing-like and located at an acute angle to the axis of the screw 10. The feed opening 19 would, of course, still be disposed rearwardly thereof with respect to the direction of rotation and in the cavitation area or zone created by the boss. Moreover, it is comprehended that the cutting means 22 can be carried by the inner bore 3 of the casing and rotated about the no-flight portion of the screw 10 to achieve similar results. Similarly, even a stationary boss carried by the inner bore of the casing could be employed to shear the advancing plug.

Finally, it should be understood that it is not intended that this invention be limited to a mixer-extruder wherein only a single screw is employed. There are numerous conventional dual and multi-screw extruder arrangements which can be economically and easily adapted by those skilled in the art to incorporate the inventive features shown herein.

While particular embodiments of this invention have been shown and/or described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described our invention, what we claim and desire to protect by Letters Patent is:

1. The method of adding a fluid to and mixing it with a plastic material which comprises the steps of forcing a plastic material along a conduit, compacting the plastic material into a cylindrically annular plug, inducing a zone of lower pressure within a section of the plug substantially normal to the axis thereof than in the remainder of the plug, adding a fluid to the plug in the zone of lower pressure, and kneading the resultant mixture to intimately disperse the fluid within the plastic material.

2. The method of adding a fluid to and mixing it wth a plastic material which comprises the steps of forcing a plastic material into a cylindrically annular plug, shearing at least a portion of the plug substantially normal to the axis thereof, adding a fluid to the plastic material at the surfaces created by the shearing, and thereafter kneading the resultant mixture to intimately disperse the fluid within the plastic material.

3. The method of adding a fluid to and mixing it with a plastic material and extruding the resultant product which comprises the steps of introducing a plastic material into a conduit at an inlet thereof, compacting the plastic material into an advancing cylindrically annular plug while forcing the material along the conduit toward an outlet thereof, shearing at least a portion of the advancing plug substantially normal to the axis thereof while simultaneously injecting a fluid into that portion of the plastic that has just undergone shear, kneading the resultant mixture while advancing the mixture toward the outlet of the conduit to intimately disperse the fluid within the plastic material, and extruding the resultant product from the outlet of the conduit.

4. Apparatus for adding a fluid to a plastic material and intimately dispersing the fluid therein, comprising: a conduit, screw means including a non-threaded zone, said screw means being rotatably mounted in said conduit for forcing a plastic material therethrough, means to form the plastic material into a plug within said conduit, means secured to said screw means at the non-threaded zone thereof and rotatable therewith for inducing a zone of low pressure within said plug, means to add a fluid to the zone of low pressure in said plug, and means to knead the resultant mixture to intimately disperse the fluid within the plastic material.

5. Apparatus for adding a fluid to a plastic material and intimately dispersing the fluid therein, comprising: a conduit, screw means including a non-threaded zone, said screw means being rotatably mounted in said conduit for forcing a plastic material therethrough, means to form the plastic material into an advancing plug within said conduit, means secured to said screw means at the non-threaded zone thereof and rotatable therewith for shearing the advancing plug, means to add a fluid to the surfaces created by the shearing of the plug, and means to knead the resultant mixture to intimately disperse the fluid within the plastic material.

6. Apparatus for adding a fluid to a plastic material, intimately dispersing the fluid therein and extruding the resultant product, comprising: a conduit having spaced inlet and outlet openings, screw means including a non-threaded zone, said screw means being rotatably mounted in said conduit for forcing a plastic material therethrough, means to form the plastic material into an advancing plug while forcing the material toward said outlet opening, means secured to said screw means at the non-threaded zone thereof and rotatable therewith for helically shearing the advancing plug to thereby form a low pressure area in said plug, means for feeding a fluid into said low pressure area, and means to knead the resultant mixture while advancing the mixture toward the outlet opening.

7. A mixer-extruder apparatus for adding a fluid to a plastic material, intimately dispersing the fluid in the plastic material and extruding the resultant product, comprising: a casing having an inner bore forming a conduit; multi-zone helical screw means rotatably mounted in said casing, said multi-zone screw means including a first zone having helical threads for receiving and compacting the plastic material, and a second non-threaded zone forming with the bore of said casing an annular chamber adapted to shape the compacted plastic material into an annular plug; cutting means positioned in said chamber and secured to said screw means for helically shearing the annular plug; conduit means having one end terminating in said chamber for delivering a fluid to the surfaces created by the shearing of the plug to thereby form a mixture of fluid and plastic material; and a third zone on said screw means including a helically threaded portion adjacent to said chamber for removing the mixture from the chamber, kneading the mixture to intimately disperse the fluid in the plastic material and extruding the resultant product from the casing.

8. Apparatus as described in claim 7 wherein said cutting means comprises a raised boss that is generally wedge-shaped in plan, said boss extending radially from said screw means into close proximity with the bore of said casing, the apex of the wedge-shaped boss pointing generally in the direction of rotation of said screw means, and wherein said conduit means includes a passageway formed at least in part within said screw means, said end of said conduit means being positioned closely adjacent to and rearwardly of said cutting means, said end of said conduit means terminating immediately adjacent the base of said wedge-shaped boss.

9. A mixer-extruder apparatus for adding a fluid to a plastic material, intimately dispersing the fluid in the plastic material and extruding the resultant product, comprising: a cylindrical casing having an inner cylindrical bore forming a conduit, said casing having spaced inlet and outlet openings therein adapted, respectively, to receive and discharge material; a multi-zone screw rotatably mounted in said casing for forcing material through said bore from the inlet opening to the outlet opening, said screw including a first zone having helical threads cooperable with said inlet opening and adapted to receive a plastic material therein and compact the plastic material, and a second non-threaded zone forming with the surrounding bore of said casing a cylindrical annular chamber adapted to shape the plastic material into a cylindrical annular plug; cutting means carried by said screw in said second zone and within said chamber for helically shearing the annular plug and lowering the pressure within said plug between the sheared portions thereof; conduit means including a passageway within said screw having one end terminating in said chamber adjacent said cutting means for delivering a fluid to the low-pressure area of the sheared plug to thereby form a mixture of fluid and plastic material; and a third zone on said screw including a helically-threaded portion adjacent to said chamber for removing the mixture from the chamber, kneading the mixture to intimately disperse the fluid in the plastic material and extruding the resultant product from the outlet opening of the casing.

10. Apparatus as described in claim 9 wherein said cutting means comprises a raised boss that is generally wedge-shaped in plan, said boss being carried by said screw and extending radially therefrom into close proximity with the bore of said casing, the apex of the wedge-shaped boss pointing generally in the direction of rotation of said screw, and said end of the fluid passageway opening through the screw immediately adjacent the base of the wedge-shaped boss.

References Cited in the file of this patent

UNITED STATES PATENTS

| | | |
|---|---|---|
| Re. 23,948 | Fuller | Feb. 15, 1955 |
| 2,048,286 | Peace | July 21, 1936 |
| 2,765,491 | Magerkurth | Oct. 9, 1956 |
| 2,817,876 | Gandelli et al. | Dec. 31, 1957 |
| 2,970,817 | Gurley | Feb. 7, 1961 |
| 3,023,456 | Palfey | Mar. 6, 1962 |

FOREIGN PATENTS

| | | |
|---|---|---|
| 452,810 | Canada | Nov. 23, 1948 |
| 1,003,469 | France | Mar. 18, 1952 |
| 153,886 | Australia | Oct. 30, 1953 |